(12) United States Patent
Ozawa (10) Patent No.: US 11,594,745 B2
(45) Date of Patent: Feb. 28, 2023

(54) ELECTRODE CATALYST LAYER, MEMBRANE ELECTRODE ASSEMBLY AND POLYMER ELECTROLYTE FUEL CELL

(71) Applicant: TOPPAN PRINTING CO., LTD., Tokyo (JP)

(72) Inventor: Madoka Ozawa, Tokyo (JP)

(73) Assignee: TOPPAN PRINTING CO., LTD., Tokyo (JP)

(*) Notice: Subject to any disclaimer, the term of this patent is extended or adjusted under 35 U.S.C. 154(b) by 222 days.

(21) Appl. No.: 16/465,114

(22) PCT Filed: Oct. 29, 2018

(86) PCT No.: PCT/JP2018/040171
§ 371 (c)(1),
(2) Date: May 29, 2019

(87) PCT Pub. No.: WO2019/088042
PCT Pub. Date: May 9, 2019

(65) Prior Publication Data
US 2019/0393528 A1 Dec. 26, 2019

(30) Foreign Application Priority Data

Oct. 30, 2017 (JP) .............................. JP2017-209457
Mar. 29, 2018 (JP) .............................. JP2018-065718

(51) Int. Cl.
*H01M 4/88* (2006.01)
*H01M 4/96* (2006.01)
*H01M 8/102* (2016.01)

(52) U.S. Cl.
CPC ......... *H01M 8/102* (2013.01); *H01M 4/8828* (2013.01); *H01M 4/96* (2013.01)

(58) Field of Classification Search
CPC ........ H01M 8/10; H01M 4/96; H01M 4/9083; H01M 4/926; H01M 8/102; H01M 4/8828;
(Continued)

(56) References Cited

U.S. PATENT DOCUMENTS 7,150,932 B1 12/2006 Höfler et al.
7,687,187 B2* 3/2010 Fukuda ............... H01M 8/0243
429/523

(Continued)

FOREIGN PATENT DOCUMENTS

EP 1009048 A1 6/2000
JP 2004-158387 A 6/2004
(Continued)

OTHER PUBLICATIONS

"Inclination vs Orientation—What's the Difference?" WikiDiff, May 24, 2021, wikidiff.com/inclination/orientation. (Year: 2021).*
(Continued)

*Primary Examiner* — Maria Laios
*Assistant Examiner* — Grace Ann Kenlaw
(74) *Attorney, Agent, or Firm* — Squire Patton Boggs (US) LLP (57) ABSTRACT

Provided are an electrode catalyst layer, a membrane electrode assembly and a polymer electrolyte fuel cell, having sufficient drainage property and gas diffusibility with high power generation performance over a long term. An electrode catalyst layer (10) bonded to a surface of a polymer electrolyte membrane (11) includes at least a catalyst substance (12), a conductive carrier (13), a polymer electrolyte (14) and fibrous substances (15). The number of the fibrous substances (15) in which inclination θ of axes with respect to a surface of the electrode catalyst layer (10) bonded to the surface of the polymer electrolyte membrane (11) is
(Continued)

$0° \leq \theta < 45°$, among the fibrous substances (15), is greater than 50% of the total number of the fibrous substances (15) contained.

9 Claims, 3 Drawing Sheets

(58) Field of Classification Search
CPC ............ H01M 8/1062; H01M 4/8605; H01M 2008/1095; H01M 8/1004; H01M 8/12; Y02E 60/50
See application file for complete search history.

(56) References Cited

U.S. PATENT DOCUMENTS

| | | | |
|---|---|---|---|
| 2003/0087145 A1 | 5/2003 | Yasumoto et al. | |
| 2004/0115517 A1 | 6/2004 | Fukuda et al. | |
| 2005/0181270 A1 | 8/2005 | Sugiura | |
| 2007/0231672 A1* | 10/2007 | Tanaka | H01M 4/926 429/480 |
| 2008/0241641 A1 | 10/2008 | Kurita et al. | |
| 2009/0075157 A1 | 3/2009 | Pak et al. | |
| 2010/0075201 A1* | 3/2010 | Nakanishi | H01M 8/1004 429/434 |
| 2011/0189580 A1 | 8/2011 | Nicotera et al. | |
| 2013/0011764 A1 | 1/2013 | Okada et al. | |
| 2013/0130133 A1 | 5/2013 | Jiang et al. | |
| 2013/0236810 A1 | 9/2013 | Jiang et al. | |
| 2016/0301081 A1 | 10/2016 | Mei et al. | |
| 2017/0250431 A1 | 8/2017 | Pintauro et al. | |
| 2021/0143460 A1* | 5/2021 | Ishimoto | H01M 4/8657 |

FOREIGN PATENT DOCUMENTS

| | | |
|---|---|---|
| JP | 3617237 B2 | 2/2005 |
| JP | 2005-228601 A | 8/2005 |
| JP | 2007-242535 A | 9/2007 |
| JP | 2007-257886 A | 10/2007 |
| JP | 2010-212127 A | 9/2010 |
| JP | 2011-049179 A | 3/2011 |
| JP | 2012-243693 A | 12/2012 |
| JP | 5537178 B2 | 7/2014 |
| WO | WO 2008/151068 A1 | 12/2008 |

OTHER PUBLICATIONS

International Search Report dated Jan. 22, 2019, in International Patent Application No. PCT/JP2018/040171, 2 pages.
Extended European Search Report (EESR) for European Patent Application No. 18874318.1, dated Jul. 20, 2020, 14 pages.
International Preliminary Report on Patentability (Chapter 1), for International PCT Application No. PCT/JP2018/040171, with English translation, translation dated May 14, 2020, 12 pages.
Communication Pursuant to Article 94(3) EPC dated Jan. 7, 2022 for European Application No. 18874318.1, 11 pages.
Communication Pursuant to Article 94(3) EPC dated Oct. 6, 2022 for European Application No. 18874318.1, 6 pages.

* cited by examiner

ELECTRODE CATALYST LAYER, MEMBRANE ELECTRODE ASSEMBLY AND POLYMER ELECTROLYTE FUEL CELL

CROSS-REFERENCE

This application is a 35 U.S.C. 371 filing of International Application No. PCT/JP2018/040171 filed on Oct. 29, 2018, which claims priority to Japanese Application No. JP 2018-065718 filed on Mar. 29, 2018, and Japanese Application No. JP 2017-209457 filed on Oct. 30, 2017, all of which are incorporated verbatim herein by reference in their entirety, including the specifications, drawings, and the claims.

TECHNICAL FIELD

The present invention relates to an electrode catalyst layer, a membrane electrode assembly and a polymer electrolyte fuel cell.

BACKGROUND ART

A fuel cell is a power generation system that generates electricity from a chemical reaction of hydrogen and oxygen. The fuel cell has advantageous effects of higher efficiency, lower environmental load, and lower noise, compared to the conventional power generation, which is attracting attention as a future clean energy source. Especially, a polymer electrolyte fuel cell capable of being used at around room temperature is prospectively expected to be used in automotive power supplies and household stationary power supplies. In recent years, various researches and developments on the polymer electrolyte fuel cell have been conducted. Challenges for practical application of the polymer electrolyte fuel cell include improvement in battery performance such as power generation characteristics and durability, infrastructure improvement, reduction in manufacturing cost, and the like.

The polymer electrolyte fuel cell is generally formed by stacking unit cells. The unit cell has a structure in which a membrane electrode assembly, where a fuel electrode (anode) for supplying a fuel gas and an oxygen electrode (cathode) for supplying an oxidant are bonded to both sides of a polymer electrolyte membrane, is sandwiched by a separator having a gas flow path and a cooling water flow path. The fuel electrode (anode) and the oxygen electrode (cathode) mainly and respectively consist of an electrode catalyst layer including at least a catalyst substance such as a platinum-based noble metal, a conductive carrier and a polymer electrolyte; and a gas diffusion layer having gas permeability and conductivity.

In the polymer electrolyte fuel cell, electricity can be taken out through the following electrochemical reaction: first, hydrogen contained in the fuel gas is oxidized by the catalytic substance to generate protons and electrons in an electrode catalyst layer on the fuel electrode side. The generated protons pass through a polymer electrolyte membrane in the electrode catalyst layer and a polymer electrolyte membrane in contact with the electrode catalyst layer, and reach an electrode catalyst layer on the oxygen electrode side. Moreover, electrons generated simultaneously are transferred to the electrode catalyst layer on the oxygen electrode side, via a conductive carrier in the electrode catalyst layer, a gas diffusion layer in contact with a side of the electrode catalyst layer opposite to the polymer electrolyte membrane, a separator, and an external circuit. The protons and electrons react with oxygen contained in oxidant gas to produce water, in the electrode catalyst layer on the oxygen electrode side.

The gas diffusion layer has a function of diffusing the gas supplied from the separator and supplying it into the electrode catalyst layer. Pores in the electrode catalyst layer are positioned ahead of the gas diffusion layer from the separator and serve as passages for transporting a plurality of substances. The pores of the fuel electrode are required to have a function to smoothly supply the fuel gas to a three-phase interface which is an oxidation-reduction reaction field. Further, the pores of the oxygen electrode are required to have a function of smoothly supplying the oxidant gas. For smooth supplying of the gas, it is important that there are gaps between the pores in the electrode catalyst layer so that the pores are not densely distributed.

As means for controlling so that the pore distribution in the electrode catalyst layer does not become dense, for example, the electrode catalyst layer containing carbon having different particle diameters or carbon fibers has been proposed (see PTLs 1 and 2).

CITATION LIST

Patent Literature

PTL 1: JP 3617237 B2
PTL 2: JP 5537178 B2

SUMMARY OF INVENTION

Technical Problem

In PTL 1, it is prohibited that the pores in the electrode catalyst layer are closely packed by combining carbon particles having different particle sizes. Meanwhile, in PTL 2, it is prohibited that the pores in the electrode catalyst layer are closely packed by combining carbon fibers having different fiber lengths. However, in these methods, although the pores in the electrode catalyst layer are hard to be densely packed, shapes of the pores in the electrode catalyst layer are not taken into consideration.

That is, the present invention has been made in view of the above points, of which the object is to provide an electrode catalyst layer, a membrane electrode assembly and a polymer electrolyte fuel cell capable of improving the gas diffusibility in the electrode catalyst layer with high power generation performance over a long term.

Solution to Problem

In order to solve the problem, an electrode catalyst layer according to one embodiment of the present invention is an electrode catalyst layer bonded to a polymer electrolyte membrane, which includes a catalyst substance; a conductive carrier; a polymer electrolyte; and fibrous substances, in which the number of the fibrous substances in which inclination $\theta$ of axes with respect to a surface of the electrode catalyst layer bonded to a surface of the polymer electrolyte membrane is $0° \leq \theta < 45°$, among the fibrous substances, is greater than 50% of the total number of the fibrous substances contained.

Advantageous Effects of Invention

According to an aspect of the present invention, it is possible to provide an electrode catalyst layer, a membrane electrode assembly and a polymer electrolyte fuel cell capable of improving the gas diffusibility in the electrode catalyst layer with high power generation performance over a long term.

DESCRIPTION OF EMBODIMENTS

Embodiments of the present invention will now be described with reference to the drawings. It should be noted that the present invention is not limited to the embodiments described below. It is also possible to change or modify a design based on knowledge of those skilled in the art, and those modifications are also included in the scope of the present invention. Each drawing is exaggeratedly illustrated as appropriate for better understanding.

The inventors of the present invention have conducted intensive studies on the initial power generation performance and durability power generation performance of the polymer electrolyte fuel cell, and consequently found that the gas diffusibility in the electrode catalyst layer greatly affects these performances. A large void is formed in an in-plane direction (a direction orthogonal to a film thickness direction) with respect to a film thickness direction of an electrode catalyst layer, whereby the gas diffusibility of the gas in the in-plane direction is improved, and a polymer electrolyte fuel cell is obtained which inhibits decrease of the output and deterioration of the electrode catalyst layer and exhibits high power generation performance over a long term.

Figure 5:
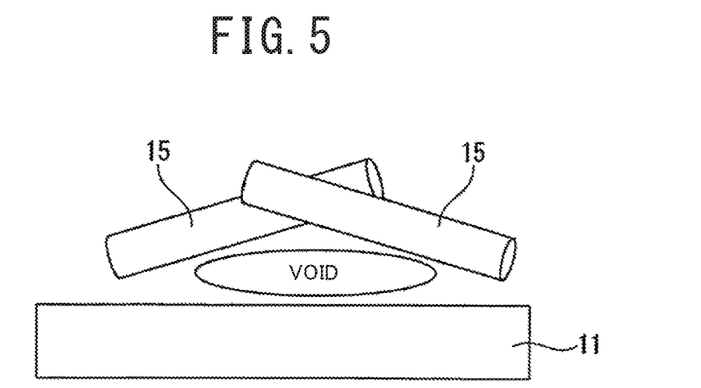
FIG. 5 is a diagram illustrating a void formed of fibrous substances.

Heretofore, inclination of the fibrous substance has not been taken into consideration. However, as found by the inventors of the present invention, on the assumption that there are two adjacent fibrous substances 15 as shown in FIG. 5, in a case where the inclination of one axis of the two fibrous substances 15 is lower than 45°, especially in a case where the inclination of both axes is lower than 45°, voids spreading in the in-plane direction (the direction orthogonal to the film thickness direction) are easily formed between the fibrous substances 15 to contribute to improvement of gas diffusibility and uniform power generation in the plane. Furthermore, in a case where the number of fibrous substances of which axis inclination is smaller than 20° is less than 70% of the total number of the fibrous substances contained, or in a case where the number of fibrous substances of which axis inclination is smaller than 40° is more than 80% of the total number of the fibrous substances contained, more suitable voids are formed. Note that, as shown in FIG. 5, in an electrode catalyst layer 10 according to the embodiment, the axes of the fibrous substances 15 are not oriented. The term "oriented" indicates a state in which the long axes of the fibrous substances 15 in the electrode catalyst layer 10 are aligned in only one direction.

[Configuration of Electrode Catalyst Layer]

Hereinafter, a specific configuration of the electrode catalyst layer according to the embodiment will be described with reference to FIGS. 1 and 2.

Figure 1:
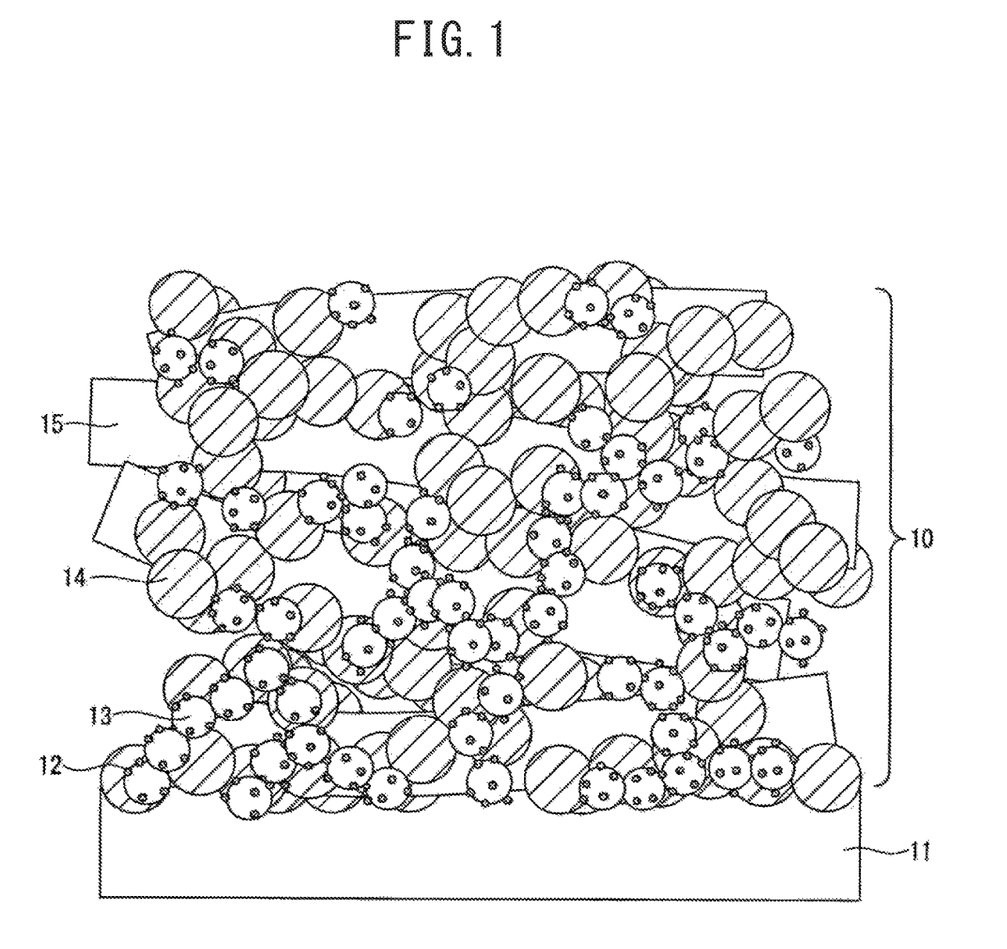
FIG. 1 is a schematic cross-sectional view illustrating a configuration example of an electrode catalyst layer according to an embodiment.

As shown in a schematic view of FIG. 1, an electrode catalyst layer 10 according to the present embodiment is bonded to a surface of a polymer electrolyte membrane 11, and includes a catalyst substance 12, a conductive carrier 13, a polymer electrolyte 14, and fibrous substances 15. A portion where none of the constituent elements described above exists forms a void.

The electrode catalyst layer 10 according to the embodiment is configured such that the number of the fibrous substances 15 in which inclination θ of axes with respect to a surface of the electrode catalyst layer 10 bonded to a surface of the polymer electrolyte membrane 11 is 0°≤θ<45° is greater than 50% of the total number of the fibrous substances contained in the electrode catalyst layer 10. Moreover, the number of the fibrous substances 15 in which inclination θ of the axes of the fibrous substances 15 is 0° ≤θ<20° is preferably less than 70%, and more preferably 40% or more and less than 70%, of the total number of the fibrous substances contained. In a case where the number of the fibrous substances 15 in which inclination θ of the axes is 0°≤θ<20° is more than 70% of the total number of the fibrous substances contained, the void may be narrow and thus sufficient drainage property and gas diffusibility may not be obtained.

Furthermore, the number of the fibrous substances 15 in which inclination θ of the axes of the fibrous substances 15 is 0°≤θ<40° is preferably more than 80%, and more preferably 85% or more, of the total number of the fibrous substances contained in the electrode catalyst layer 10. In a case where the number of the fibrous substances 15 in which inclination θ of the axes is 0°≤θ<40° is less than 80% of the total number of the fibrous substances contained, voids spreading in an in-plane direction (a direction orthogonal to a film thickness direction) may not be sufficiently formed. Consequently, the voids may not be able to contribute to improvement of gas diffusibility and uniform power generation in the plane.

The fibrous substance 15 for determining the inclination θ of the axis is a fibrous substance, for example, having a length of a fiber exposed in a cross-section of 0.8 μm or more by observing the cross-section of the electrode catalyst layer 10 with a scanning electron microscope (SEM).

Accordingly, voids having sufficient drainage property and gas diffusibility are easily formed in the electrode catalyst layer 10. The surface of the electrode catalyst layer 10 is a surface parallel to surfaces 10Aa and 10Ca, which are bonded to a surface of the polymer electrolyte membrane 11, and also parallel to the surface (bonding surface) of the polymer electrolyte membrane 11 in a case where a thickness of the electrode catalyst layer 10 is uniform. Therefore, the inclination θ of the axis with respect to the surface of the electrode catalyst layer 10 is the same as an angle with respect to the surface (bonding surface) of the polymer electrolyte membrane 11 and an angle with respect to the surfaces 10Aa and 10Ca, which are bonded to the surface of the polymer electrolyte membrane 11. That is, the inclination θ of the axis of the fibrous substance 15 has any of the surface of the electrode catalyst layer 10, the surface (bonding surface) of the polymer electrolyte membrane 11, and the surfaces 10Aa and 10Ca of the electrode catalyst layer 10, which are bonded to the surface of the polymer electrolyte membrane 11, as a reference surface.

Here, the inclination θ of the axis with respect to the reference surface will be described.

Figure 2A:
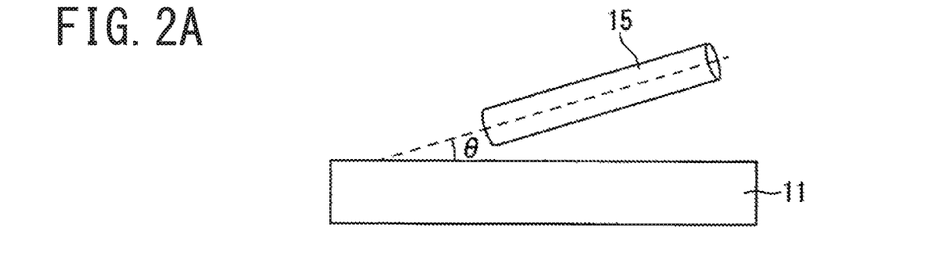
FIG. 2 is an explanatory diagram of inclination θ of an axis of a fibrous substance.
Figure 2B:
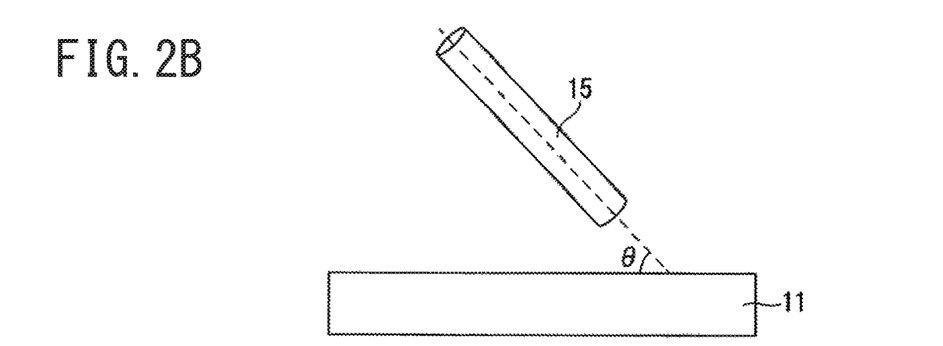

FIG. 2 is an explanatory diagram schematically illustrating the inclination θ of the axis of the fibrous substance 15 with respect to the surface (bonding surface) of the polymer electrolyte membrane 11. A dotted line in FIG. 2 is the axis of the fibrous substance 15, and an angle between the axis of the fibrous substance 15 and the surface of the polymer electrolyte membrane 11 is the inclination θ of the axis of the fibrous substance 15 with respect to the surface of the polymer electrolyte membrane 11. As shown in FIGS. 2A and 2B, the inclination θ is considered as an acute angle and falling within the range of 0°≤θ≤90°, regardless of an inclination direction of the fibrous substance 15.

In FIGS. 2A and 2B, a case where the fibrous substance 15 is straight without being branched has been described as an example. However, the axis of the fibrous substance 15 may be branched, bent in multiple stages, or curved. In a case of the branched axis, the same effect can be obtained as long as the longest portion extending in the straight line falls within the range described above. In cases that the axis is bent in multiple stages or curved, the same effect can be obtained if the inclination θ between the reference surface and a standard plane of the fibrous substance 15 falls within the range described above, with a surface with which the fibrous substance 15 is most in contact as the standard plane.

The thickness of the electrode catalyst layer is preferably 5 μm or more and 30 μm or less. In a case where the thickness is more than 30 μm, cracks tend to occur while diffusibility and conductivity of gas and generated water are lowered when used in a fuel cell, thereby decreasing the output. In a case where the thickness is less than 5 μm, the layer thickness tends to vary, and thus the internal catalytic substance and the polymer electrolyte tend to be nonuniform. Cracks on the surface of the electrode catalyst layer and nonuniformity in thickness are undesirable because they are highly likely to adversely affect the durability when used as the fuel cell and operated over a long period of time.

The inclination θ of the axis of the fibrous substance 15 with respect to the reference surface and the thickness of the electrode catalyst layer 10 can be measured by observing, for example, the cross-section of the electrode catalyst layer 10 with a scanning electron microscope (SEM). As a method for exposing the cross-section of the electrode catalyst layer 10, for example, known methods such as ion milling, ultramicrotome and the like can be used. When performing processing for exposing the cross-section, it is preferable to perform the processing while cooling the electrode catalyst layer 10 in order to reduce damage to the polymer electrolyte 14 constituting the polymer electrolyte membrane 11 and the electrode catalyst layer 10.

Examples of the catalyst substance 12 according to the embodiment include platinum group elements and metals, with alloys, oxides, mixed oxides, carbides, or the like thereof. Examples of platinum group elements include platinum, palladium, ruthenium, iridium, rhodium and osmium. Exemplified metals include iron, lead, copper, chromium, cobalt, nickel, manganese, vanadium, molybdenum, gallium, aluminum and the like.

As the conductive carrier 13, any material may be used as long as it has conductivity and can carry the catalyst substance 12 without being affected by the catalyst substance 12. Carbon particles are generally used as the conductive carrier 13. Examples of the carbon particles include Carbon Black, graphite, activated carbon, carbon nanotube, carbon nanofiber and fullerene. If a particle size of the carbon particles is too small, it is difficult to form an electron conduction path. If it is too large, the gas diffusibility of the electrode catalyst layer 10 decreases or the utilization factor of the catalyst lowers. Thus, the particle size is preferably about 10 to 1000 nm, more preferably about 10 to 100 nm.

As the polymer electrolyte 14 contained in the polymer electrolyte membrane 11 and the electrode catalyst layer 10, any polymer electrolyte may be used as long as it has proton conductivity. A fluorine-based polymer electrolyte and a hydrocarbon-based polymer electrolyte can be used. Examples of the fluorine-based polymer electrolyte include a polymer electrolyte having a tetrafluoroethylene skeleton, for example, "Nafion (registered trademark)" manufactured by Du Pont Co., Ltd., or the like. Examples of the hydrocarbon-based polymer electrolyte include sulfonated polyether ketone, sulfonated polyether sulfone, sulfonated polyether ether sulfone, sulfonated polysulfide, sulfonated polyphenylene, and the like. The polymer electrolyte contained in the polymer electrolyte membrane 11 and the polymer electrolyte 14 contained in the electrode catalyst layer 10 may be the same as each other or different from each other. However, considering the interface resistance between the polymer electrolyte membrane 11 and the electrode catalyst layer 10 and the dimensional change rates in the polymer electrolyte membrane 11 and the electrode catalyst layer 10 at the time of humidity change, it is preferable that the polymer electrolyte contained in the polymer electrolyte membrane 11 and the polymer electrolyte 14 contained in the electrode catalyst layer 10 are the same or similar components.

As the fibrous substance, for example, an electron conductive fiber and a proton conductive fiber can be used. As for the fibrous substance, one of the following fibers may be used alone, or two or more kinds thereof may be used in combination. The electron conductive fiber and the proton conductive fiber may also be used in combination.

Examples of the electron conductive fiber according to the embodiment include a carbon fiber, a carbon nanotube, a carbon nanohorn, a conductive polymer nanofiber, and the like. In particular, a carbon nanofiber is preferable in terms of conductivity and dispersibility. Further, it is more preferable to use an electron conductive fiber having catalytic ability in order to reduce the use amount of catalyst made of a noble metal. In a case of being used as an air electrode of a polymer electrolyte fuel cell, for example, a carbon alloy catalyst prepared from the carbon nanofibers can be employed. Alternatively, the electrode active material for the oxygen reduction electrode may be processed into a fibrous form. For example, a material containing at least one transition metal element selected from Ta, Nb, Ti, and Zr can be used. Partial oxides of carbonitrides of these transition metal elements, or conductive oxides and conductive oxynitrides of these transition metal elements can be adopted.

As the proton conductive fiber according to the embodiment, any polymer electrolyte having proton conductivity processed into a fibrous form may be used. For example, it is possible to use a fluorine-based polymer electrolyte or a hydrocarbon-based polymer electrolyte. Examples of the fluorine-based polymer electrolyte include Nafion (registered trademark) manufactured by Du Pont Co., Ltd., Flemion (registered trademark) manufactured by Asahi Glass Co., Ltd., Aciplex (registered trademark) manufactured by Asahi Kasei Corporation, Gore Select (registered trademark) manufactured by Gore Co., Ltd., and the like. Examples of the hydrocarbon-based polymer electrolyte include electrolytes such as sulfonated polyether ketone, sulfonated polyether sulfone, sulfonated polyether ether sulfone, sulfonated polysulfide, sulfonated polyphenylene and the like. Among these, Nafion (registered trademark)-based material manufactured by Du Pont Co., Ltd. can be suitably used as the polymer electrolyte. Examples of the hydrocarbon-based polymer electrolyte include electrolytes such as sulfonated polyether ketone, sulfonated polyether sulfone, sulfonated polyether ether sulfone, sulfonated polysulfide, sulfonated polyphenylene and the like.

The fiber diameter of the fibrous substance 15 is preferably from 0.5 to 500 nm, more preferably from 5 to 200 nm. With the fiber diameter falling within the range described above, it is possible to increase the voids in the electrode catalyst layer 10, thereby implementing the high output.

The fiber length of the fibrous substance 15 is preferably 1 to 40 μm, and more preferably 1 to 20 μm. With the fiber length falling within the range described above, it is possible to enhance the strength of the electrode catalyst layer 10 and to suppress occurrence of cracks during formation. Furthermore, it is possible to increase the voids in the electrode catalyst layer 10, thereby implementing the high output.

[Configuration of Membrane Electrode Assembly]

Figure 3:
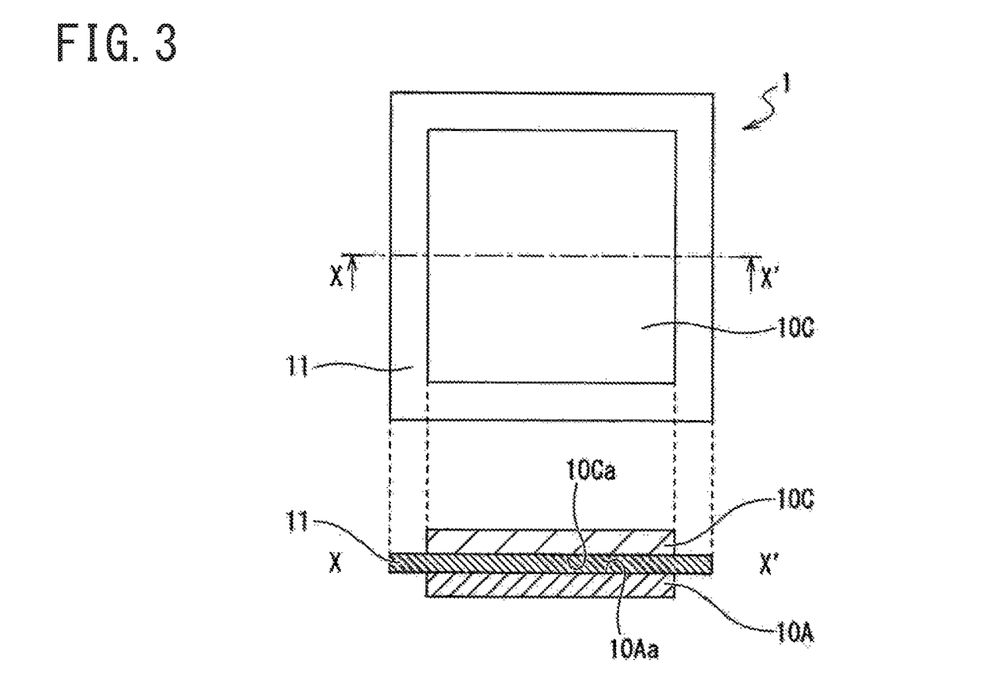
FIG. 3 illustrates an exemplified configuration of a membrane electrode assembly of the embodiment, including a plan view of the membrane electrode assembly viewed from the oxygen electrode side of the electrode catalyst layer, and is a cross-sectional view taken along a line X-X' of the plan view.

Referring to FIG. 3, a specific configuration of the membrane electrode assembly 1 including the electrode catalyst layer 10 according to the embodiment will be described.

FIG. 3 illustrate an exemplified configuration of the membrane electrode assembly according to the embodiment including a plan view of the membrane electrode assembly viewed from the oxygen electrode side of the electrode catalyst layer 10, and a cross-sectional view taken along a line X-X' of the plan view.

As shown in FIG. 3, the membrane electrode assembly 1 includes the polymer electrolyte membrane 11 and electrode catalyst layers 10C and 10A, which are bonded to respective surfaces of the polymer electrolyte membrane 11. In the embodiment, the electrode catalyst layer 10C formed on an upper surface of the polymer electrolyte membrane 11 is a cathode-side electrode catalyst layer constituting the oxygen electrode, and the electrode catalyst layer 10A formed on a lower surface of the polymer electrolyte membrane 11 is an anode-side electrode catalyst layer constituting the fuel electrode. Hereinafter, the pair of electrode catalyst layers 10C and 10A may be simply referred to as "electrode catalyst layer 10" when there is no need to distinguish them.

Note that an outer peripheral portion of the electrode catalyst layer 10 may be sealed with a gasket or the like (not shown).

Preparation of the electrode catalyst layer 10 and bonding of the electrode catalyst layer 10 to the surface of the polymer electrolyte membrane 11 are carried out as follows.

At least the catalyst substance 12, the conductive carrier 13, the polymer electrolyte 14, and the fibrous substance 15 are mixed in a solvent and subjected to dispersion treatment, thereby preparing a catalyst ink. Various techniques such as a planetary ball mill, a bead mill, an ultrasonic homogenizer and the like can be used for dispersion treatment.

A solvent used as the dispersion medium of the catalyst ink is not particularly limited as long as it does not erode the catalyst substance 12, the conductive carrier 13, the polymer electrolyte 14 and the fibrous substance 15, and is able to dissolve or disperse as a fine gel the polymer electrolyte 14 in a state of high fluidity. Water may be contained in the solvent, which is compatible with the polymer electrolyte 14. It is desirable that at least a volatile liquid organic solvent be contained in the catalyst ink. However, when a lower alcohol is used as the solvent, it has a high risk of ignition. Therefore, when using such a solvent, mixing the solvent with water is preferable. An amount of water added is not particularly limited as long as it does not cause turbidity or gelation due to separation of the polymer electrolyte 14.

By coating and drying the prepared catalyst ink on a substrate, the solvent component is removed from a coating film of the catalyst ink, and the electrode catalyst layer 10 is formed on the substrate.

In a case of using the polymer electrolyte membrane 11 as a substrate, for example, the catalyst ink is directly applied to the surface of the polymer electrolyte membrane 11, and then the solvent component is removed from the coating film of the catalyst ink to form the electrode catalyst layer 10.

Moreover, in a case of using a transfer substrate as the substrate, the substrate with the catalyst layer is prepared by coating and drying the catalyst ink on the transfer substrate. Thereafter, for example, by using the substrate with the catalyst layer, the surface of the electrode catalyst layer 10 of the transfer substrate with the catalyst layer and the polymer electrolyte membrane 11 are brought into contact with each other, and heated and pressurized to bond to each other.

Consequently, the electrode catalyst layer 10 is bonded to the surface of the polymer electrolyte membrane 11, and the membrane electrode assembly is manufactured by bonding the electrode catalyst layers 10 to both sides of the polymer electrolyte membrane 11.

As a method of coating the catalyst ink on the substrate, various coating methods such as die coating, roll coating, curtain coating, spray coating, squeegee and the like can be used. Die coating is particularly preferable. Die coating provides the stable film thickness of the coating intermediate portion, and thus is able to deal with intermittent coating. Furthermore, as a method for drying the applied catalyst ink, for example, a hot air oven, IR (far infrared) drying, a hot plate, reduced pressure drying and the like can be used. The drying temperature is about 40 to 200° C., preferably about 40 to 120° C. The drying time is about 0.5 minutes to 1 hour, preferably about 1 minute to 30 minutes.

In a case where bonding is performed by bringing the polymer electrolyte membrane 11 and the electrode catalyst layer 10 into contact with each other and heating and pressurizing using the substrate with the catalyst layer, the pressure and the temperature applied to the electrode catalyst layer 10 affect power generation performance of the membrane electrode assembly. In order to obtain the membrane electrode assembly having high power generation performance, the pressure applied to a laminate is desirably 0.1 MPa or more and 20 MPa or less. In a case where the pressure is larger than 20 MPa, the electrode catalyst layer 10 is over-compressed. In a case where the pressure is smaller than 0.1 MP, the bonding property between the electrode catalyst layer 10 and the polymer electrolyte membrane 11 is deteriorated and the power generation performance is deteriorated. Considering improvement of the bonding property at the interface between the polymer electrolyte membrane 11 and the electrode catalyst layer 10 and suppression of the interface resistance, the temperature at bonding is preferably in the vicinity of the glass transition point of the polymer electrolyte membrane 11 or the polymer electrolyte 14 of the electrode catalyst layer 10.

As a substrate used for the substrate with the catalyst layer, for example, a sheet body made of a fluorine-based resin or a polymer film can be used. The fluorine-based resin is excellent in transferability, and examples thereof include ethylene tetrafluoroethylene copolymer (ETFE), tetrafluoroethylene-hexafluoropropylene copolymer (FEP), tetrafluoroperfluoroalkyl vinyl ether copolymer (PFA), polytetrafluoroethylene (PTFE), and the like. Examples of the polymer film include polyimide, polyethylene terephthalate, polyamide (nylon (registered trademark)), polysulfone, polyethersulfone, polyphenylene sulfide, polyether/ether ketone, polyether imide, polyarylate, polyethylene naphthalate, and the like. As the substrate, for example, a gas diffusion layer can also be used.

It is possible to set the axis θ of the fibrous substance 15 contained in the electrode catalyst layer 10 to fall within the range described above, by adjusting parameters including heating temperature of the applied catalyst ink, blending ratio of the fibrous substance 15, solvent composition of the catalyst ink, dispersion strength at the time of catalyst ink preparation and the like.

For example, the blending ratio of the polymer electrolyte 14 in the electrode catalyst layer 10 is preferably about the same as or about a half of the weight of the conductive carrier 13. The blending ratio of the fibrous substance 15 is preferably about the same as or about a half of the weight of the conductive carrier 13. The solid content ratio of the catalyst ink is preferably as high as possible within a range capable of being applied to a thin film.

[Configuration of Polymer Electrolyte Fuel Cell]

Figure 4:
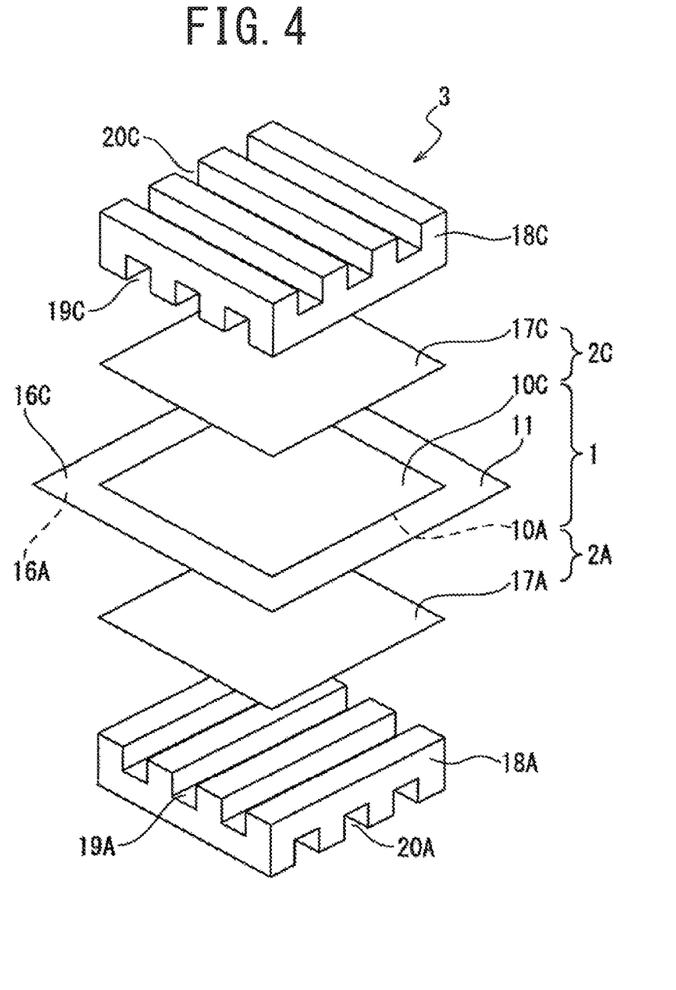
FIG. 4 is an exploded perspective view illustrating an exemplified configuration of a polymer electrolyte fuel cell according to the embodiment.

Referring to FIG. 4, a specific configuration example of the polymer electrolyte fuel cell 3 provided with the membrane electrode assembly 1 according to the embodiment will be described. FIG. 4 is an exploded perspective view illustrating an exemplified configuration of the polymer electrolyte fuel cell 3 equipped with the membrane electrode assembly 1. FIG. 4 illustrates an example of the configuration of a unit cell, but the polymer electrolyte fuel cell 3 is not limited to this configuration. A configuration in which a plurality of unit cells are stacked may be employed.

As shown in FIG. 4, the polymer electrolyte fuel cell 3 includes the membrane electrode assembly 1, a gas diffusion layer 17C, and a gas diffusion layer 17A. The gas diffusion layer 17C is disposed to face the electrode catalyst layer 10C which is the cathode-side electrode catalyst layer on the oxygen electrode side of the membrane electrode assembly 1. The gas diffusion layer 17A is disposed to face the electrode catalyst layer 10A which is the anode-side electrode catalyst layer on the fuel electrode side of the membrane electrode assembly 1. Then, the oxygen electrode 2C is formed by the electrode catalyst layer 10C and the gas diffusion layer 17C, and the fuel electrode 2A is formed by the electrode catalyst layer 10A and the gas diffusion layer 17A. In order to prevent gas leakage from an outer peripheral portion, to which the electrode catalyst layer 10 is not bonded, of the polymer electrolyte membrane 11, a gasket 16C on the oxygen electrode side and a gasket 16A on the fuel electrode side are disposed.

Furthermore, the polymer electrolyte fuel cell 3 includes a separator 18C disposed to face the oxygen electrode 2C, and a separator 18A disposed to face the fuel electrode 2A. The separator 18C has a gas flow path 19C for flowing the reactant gas, which is formed on a surface facing the gas diffusion layer 17C, and a cooling water flow path 20C for flowing cooling water, which is formed on a surface opposite to the surface on which the gas flow path 19C is formed. The separator 18A has the same configuration as that of the separator 18C, and has a gas flow path 19A formed on a surface facing the gas diffusion layer 17A and a cooling water flow path 20A formed on a surface opposite to the surface on which the gas flow path 19A is formed. The separators 18C and 18A are made of conductive and gas-impermeable materials.

In the polymer electrolyte fuel cell 3, an oxidant such as air or oxygen is supplied to the oxygen electrode 2C through the gas flow path 19C of the separator 18C, while fuel gas or organic fuel containing hydrogen is supplied to the fuel electrode 2A through the gas flow path 19A of the separator 18A, thereby generating power.

By employing the membrane electrode assembly 1 according to the embodiment, it is possible to have sufficient drainage property and gas diffusibility, and to exhibit high power generation performance over a long term.

That is, according to the embodiment, by defining the axis of the fibrous substance 15, it is possible to provide the electrode catalyst layer 10, the membrane electrode assembly and the polymer electrolyte fuel cell, having sufficient drainage property and gas diffusibility in operation of the polymer electrolyte fuel cell with high power generation performance over a long term. Therefore, the invention can be suitably used for a stationary cogeneration system, a fuel cell automobile, etc., which utilizes a polymer electrolyte fuel cell, and has high industrial utility value.

EXAMPLES

Hereinafter, a membrane electrode assembly according to an example based on the present invention will be described.

Example 1

In Example 1, a carbon nanofiber (VGCF-H (registered trademark), manufactured by Showa Denko K. K.) was mixed with a platinum-carrying carbon catalyst (TEC10E50E, manufactured by Tanaka Kikinzoku Kogyo K. K.), water, 1-propanol and a polymer electrolyte (Nafion (registered trademark), dispersion, manufactured by Wako Pure Chemical Industries, Ltd.), and was dispersed for 60 minutes by a planetary ball mill to prepare a catalyst ink.

The prepared catalyst ink was applied to both surfaces of a polymer electrolyte membrane (Nafion 211 (registered trademark), manufactured by Du Pont, Co., Ltd.) by using a slit die coater, and was put and dried in a hot air oven at 80° C. until the stickiness of the catalyst ink was removed, thereby obtaining a membrane electrode assembly.

In this example, the thickness of the electrode catalyst layer 10 falls within the range described in paragraph 0020, and the particle size of the conductive carrier 13 (carbon particles) falls within the range described in paragraph 0023. Additionally, the fiber diameter and fiber length of the fibrous substance 15 respectively fall within the ranges described in paragraph 0027. The drying temperature of the catalyst ink and the pressure when bonding the electrolyte membrane 11 to the electrode catalyst layer 10 respectively fall within the ranges described in paragraphs 0032 to 0033. Furthermore, the blending ratio of the polymer electrolyte 14 in the electrode catalyst layer 10, the blending ratio of the fibrous substance 15, and the solid content ratio of the catalyst ink respectively fall within the ranges as described in paragraph 0035.

In Examples 2 to 7 described below, the inventors confirmed the extent to which the content of each composition (additive substance) described in Example 1 was varied.

Example 2

In Example 2, a membrane electrode assembly was obtained with the same procedure as in Example 1 except that the solid content ratio of the catalyst ink was 0.6 times.

Example 3

In Example 3, a membrane electrode assembly was obtained with the same procedure as in Example 1 except that the amount of the polymer electrolyte was increased to 1.2 times.

Example 4

In Example 4, a catalyst ink was prepared in the same manner as in Example 1 above.

The prepared catalyst ink was applied to a surface of a PTFE film using a slit die coater and was put and dried in a hot air oven at 80° C. until the stickiness of the catalyst ink was removed, thereby obtaining a substrate with a catalyst layer. The cathode-side electrode catalyst layer and the anode-side electrode catalyst layer were disposed so as to face both sides of a polymer electrolyte membrane (Nafion 211 (registered trademark), manufactured by Du Pont, Co., Ltd.). This laminate was hot-pressed and bonded at 120° C. and 5 MPa, and then the PTFE film was peeled off to obtain a membrane electrode assembly.

Example 5

In Example 5, a membrane electrode assembly was obtained with the same procedure as in Example 1 except that the amount of carbon nanofibers was doubled.

Example 6

In Example 6, a membrane electrode assembly was obtained with the same procedure as in Example 1 except that the amount of carbon nanofibers was tripled.

Example 7

In Example 7, a membrane electrode assembly was obtained with the same procedure as in Example 1 except that the amount of the polymer electrolyte was increased to 1.5 times.

Comparative Example 1

In Comparative Example 1, a membrane electrode assembly was obtained with the same procedure as in Example 1 except that the coating amount of the cathode-side electrode catalyst layer was tripled.

Comparative Example 2

In Comparative Example 2, a membrane electrode assembly was obtained with the same procedure as in Example 1 except that the dispersion time was adjusted to 10 minutes when preparing the catalyst ink.

Comparative Example 3

In Comparative Example 3, a membrane electrode assembly was obtained with the same procedure as in Example 1 except that the carbon nanofibers were not added.

Hereinafter, comparison results of the inclination $\theta$ of the axis of the fibrous substance with respect to the reference surface, thickness of the cathode-side electrode catalyst layer, and the power generation performance will be described for each of the membrane electrode assemblies of Examples 1 to 7 and membrane electrode assemblies of Comparative Examples 1 to 3, included in the polymer electrolyte fuel cells.

[Measurement of Inclination $\theta$ of Axis of Fibrous Substance]

The inclination $\theta$ of the axis of the fibrous substance with respect to the reference surface was measured by observing the cross-section of the membrane electrode assembly using a scanning electron microscope (SEM). In particular, a small piece of the membrane electrode assembly was adhered to a metal plate, and the cross-section of the electrode catalyst layer was exposed using a cross-section sample preparation apparatus IB-19520CCP manufactured by JEOL. The exposed cross-section was observed using FE-SEM S-4800 manufactured by Hitachi High-Technologies Corporation to measure $\theta$. The orientation of the sample was adjusted so that the surface of the catalyst layer was horizontal within a field of view of 1000-times observation magnification. Subsequently, the observed fibrous substance was linearly approximated within a field of view of 10000-times observation magnification to measure the inclination as the inclination $\theta$ of the axis of the fibrous substance with respect to the surface of the catalyst layer. The inclination $\theta$ of the axis was measured for the fibrous substance observed as having a length of 0.8 µm or more within a field of view at 30 observation points. [Measurement of Thickness of Electrode Catalyst Layer]

The thickness of the electrode catalyst layer was measured by observing the cross-section of the electrode catalyst layer using a scanning electron microscope (SEM). In particular, the cross-section used for measuring the inclination $\theta$ of the axis of the fibrous substance was observed at 1000 times using FE-SEM S-4800 manufactured by Hitachi High-Technologies Corporation. The thickness of the electrode catalyst layer was measured at 30 observation points, and the average value was employed as the thickness of the electrode catalyst layer.

[Measurement of Power Generation Performance]

Measurement of power generation performance was carried out according to a booklet "Cell Evaluation and Analysis Protocol" published by New Energy and Industrial Technology Development Organization (NEDO), and a gas diffusion layer, a gasket, and a separator were disposed on each side of the membrane electrode assembly. A JARI standard cell tightened so as to have a predetermined surface pressure was used as an evaluation unit cell. I-V measurement (referred to as "standard" condition) described in "Cell Evaluation and Analysis Protocol" and I-V measurement (referred to as "high humidity" condition) with both the relative humidity of the anode and the relative humidity of the cathode as RH100% were carried out.

[Comparison Results]

The inclination $\theta$ of the axis of the fibrous substance with respect to the respective reference surface, the thickness of the cathode-side electrode catalyst layer, and power generation performance, for each of the membrane electrode assemblies 1 of Examples 1 to 7 and Comparative Examples 1 to 3, included in the fuel cell, are summarized in Table 1. Regarding the inclination $\theta$, the ratio of the number of fibrous substances having an axis inclination $\theta$ smaller than 45°, the ratio of the number of fibrous substances having an axis inclination $\theta$ smaller than 20°, and the ratio of the number of fibrous substances having an axis inclination θ smaller than 40°, with respect to the total number of the fibrous substances observed, are listed. Regarding the power generation performance, in the "standard" condition, a case where the current was 25 A or more when the voltage was 0.6 V was evaluated as "O", and a case where the current was less than 25 A was evaluated as "X". In the "high humidity" condition, a case where the current was 30 A or more when the voltage was 0.6 V was evaluated as "O", and a case where the current was less than 30 A was evaluated as "X".

TABLE 1

| | 0° ≤ θ < 45° [%] | 0° ≤ θ < 20° [%] | 0° ≤ θ < 40° [%] | Thickness [μm] | Power Generation Performance | |
|---|---|---|---|---|---|---|
| | | | | | Standard | High Humidity |
| Example 1 | 89 | 59 | 87 | 15 | ○ | ○ |
| Example 2 | 91 | 63 | 89 | 13 | ○ | ○ |
| Example 3 | 89 | 61 | 86 | 13 | ○ | ○ |
| Example 4 | 91 | 56 | 90 | 14 | ○ | ○ |
| Example 5 | 79 | 53 | 77 | 20 | X | ○ |
| Example 6 | 86 | 48 | 80 | 24 | X | ○ |
| Example 7 | 87 | 73 | 86 | 11 | ○ | X |
| Comparative Example 1 | 48 | 30 | 42 | 34 | X | X |
| Comparative Example 2 | 40 | 20 | 36 | 20 | X | X |
| Comparative Example 3 | 0 | 0 | 0 | 11 | X | X |

As shown in Table 1, all of Examples 1 to 7 show that the ratio of the fibrous substance having the axis inclination θ with respect to the surface of the catalyst layer of 0° θ<45° was more than 50%. The power generation performance was evaluated as "O" under at least one of the conditions. That is, in Examples 1 to 7, the membrane electrode assembly capable of constructing a fuel cell excellent in power generation performance was obtained.

On the other hand, in Comparative Examples, each of Comparative Examples 1 to 3 shows that the ratio of the fibrous substance having the axis inclination θ with respect to the surface of the catalyst layer of 0°≤θ<45° was less than 50%. The power generation performance was evaluated as "X" under both conditions. That is, when the inclination of the fibrous substance in the electrode catalyst layer fell outside the predetermined range, the power generation performance decreased.

REFERENCE SIGNS LIST

1: membrane electrode assembly
2C: oxygen electrode
2A: fuel electrode
3: polymer electrolyte fuel cell
10, 10C, 10A: electrode catalyst layer
11: polymer electrolyte membrane
12: catalyst substance
13: conductive carrier
14: polymer electrolyte
15: fibrous substance
16C, 16A: gasket
17C, 17A: gas diffusion layer
18C, 18A: separator
19C, 19A: gas flow path
20C, 20A: cooling water flow path

The invention claimed is:

1. An electrode catalyst layer bonded to a polymer electrolyte membrane, the layer comprising:
   a catalyst substance;
   a conductive carrier;
   a polymer electrolyte; and
   fibrous substances,
   wherein the number of the fibrous substances, in which vertical inclination of axes with respect to a surface of the electrode catalyst layer bonded to a surface of the polymer electrolyte membrane is 0°≤θ<20°, is 48% or more and less than 70% of the total number of the fibrous substances contained;
   wherein the number of the fibrous substances in which vertical inclination θ of the axes of the fibrous substances is 0°≤θ<45°, is greater than 50% of the total number of the fibrous substances; and
   wherein the number of the fibrous substances, in which vertical inclination θ of the axes of the fibrous substances is 0°≤θ<40°, is greater than 80% of the total number of the fibrous substances contained.

2. The electrode catalyst layer according to claim 1, wherein the fibrous substances contain one or two selected from carbon nanofibers, carbon nanotubes, electrolyte fibers and oxynitride fibers.

3. The electrode catalyst layer according to claim 1, wherein a thickness of the electrode catalyst layer is 5 μm to 30 μm.

4. A membrane electrode assembly, comprising:
   a polymer electrolyte membrane; and
   the electrode catalyst layer according to claim 1, which is bonded to a surface on an oxygen electrode side of the polymer electrolyte membrane.

5. A polymer electrolyte fuel cell, comprising the membrane electrode assembly according to claim 4.

6. The electrode catalyst layer according to claim 3, wherein the fibrous substances contain one or two selected from carbon nanofibers, carbon nanotubes, electrolyte fibers and oxynitride fibers.

7. The electrode catalyst layer according to claim 2, wherein a thickness of the electrode catalyst layer is 5 μm to 30 μm.

8. A membrane electrode assembly, comprising:
   a polymer electrolyte membrane; and
   the electrode catalyst layer according to claim 2, which is bonded to a surface on an oxygen electrode side of the polymer electrolyte membrane.

9. A membrane electrode assembly, comprising:
a polymer electrolyte membrane; and
the electrode catalyst layer according to claim 3, which is bonded to a surface on an oxygen electrode side of the polymer electrolyte membrane.

\* \* \* \* \*